United States Patent [19]

Maher et al.

[11] Patent Number: 5,672,378
[45] Date of Patent: Sep. 30, 1997

[54] METHOD FOR MAKING A BATIO₃ POWDER MIXTURE THE POWDER MIXTURE AND METHOD FOR MAKING A Y5V CERAMIC BODY THEREFROM

[75] Inventors: Galeb H. Maher, North Adams, Mass.; Veerabhadrarao Bheemineni, Latham, N.Y.

[73] Assignee: MRA Laboratories, Inc., North Adams, Mass.

[21] Appl. No.: 635,563

[22] Filed: Apr. 22, 1996

[51] Int. Cl.⁶ .............. B05D 5/12; C04B 41/88; C04B 35/468
[52] U.S. Cl. .............. 427/123; 427/77; 264/61; 264/66; 501/137; 501/138
[58] Field of Search .............. 264/61, 66; 501/137, 501/138; 427/123, 77

[56] References Cited

U.S. PATENT DOCUMENTS

| | | | |
|---|---|---|---|
| 3,885,941 | 5/1975 | Maher | 501/137 |
| 4,066,426 | 1/1978 | Maher | 501/137 |
| 4,120,677 | 10/1978 | Burn | 501/137 |
| 4,266,265 | 5/1981 | Maher | 361/321 |
| 4,283,758 | 8/1981 | Burn | 361/321 |
| 4,335,216 | 6/1982 | Hodgkins et al. | 501/32 |
| 4,386,985 | 6/1983 | Dirstine | 156/89 |
| 4,461,844 | 7/1984 | Itakura et al. | 501/137 |
| 4,607,314 | 8/1986 | Wada | 361/321 |
| 4,607,316 | 8/1986 | Wada | 361/321 |
| 4,626,393 | 12/1986 | Wada et al. | 264/65 |
| 4,626,395 | 12/1986 | Wada et al. | 264/65 |
| 4,898,844 | 2/1990 | Maher et al. | 501/138 |
| 5,010,443 | 4/1991 | Maher | 361/321 |
| 5,130,281 | 7/1992 | Sano et al. | 501/138 |
| 5,258,338 | 11/1993 | Maher | 361/321 |
| 5,361,187 | 11/1994 | Srinivasan | 361/321.1 |
| 5,604,167 | 2/1997 | Wilson et al. | 501/138 |

OTHER PUBLICATIONS

D. Hennings and G. Rosenstein, "Temperature Stable Dielectric Based on Chemically Inhomogeneous BaTiO3", J. Am. Cer. Soc., vol. 67, No. 4, pp. 249–254 Apr. 1984.

Primary Examiner—Mark L. Bell
Assistant Examiner—Louis M. Troilo

[57] ABSTRACT

A ceramic powder mixture is made by combining from 96 to 98 mole percent of precursors of a stoichiometric barium zirconate titanate (BZT) wherein zirconium amounts to from 13.5 to 15.0 mole percent, and adding from 0.5 to 1.5 mole percent niobium or lanthanum, from 1.2 to 2.6 weight percent of a cadmium silicate sintering flux, essentially no lead, and from zero to 2 mole % of an alkaline earth metal to obtain in the powder mixture a ratio (A/B) of the large cations (A) to the small cations (B) in the range from 1.024 to 1.035. The mixture is calcined to obtain a powder comprised of agglomerates of essentially identical composition within the ranges given above. This powder of agglomerates may then be formed into a compact body that is sintered and fired to maturity at 1100° C. to produce a mature dielectric ceramic body meeting the Y5V standard and having a dielectric constant greater than 10,000 at the Curie temperature.

9 Claims, 1 Drawing Sheet

METHOD FOR MAKING A BATIO₃ POWDER MIXTURE THE POWDER MIXTURE AND METHOD FOR MAKING A Y5V CERAMIC BODY THEREFROM

BACKGROUND

This invention relates to a low-temperature sintered, lead-free dielectric-ceramic body of barium titanate and a small amount of cadmium silicate flux, the ceramic body having a high dielectric constant and a Y5V temperature coefficient of dielectric constant, suitable for use in high quality multilayer ceramic capacitors.

Multilayer ceramic capacitors (MLC's) having a Y5V dielectric temperature coefficient and low dielectric losses (low DF) are becoming an increasing portion of the large ceramic capacitor market. Progress toward better Y5V ceramic bodies having higher dielectric constants (K) has been impeded by the conflicting performance demands for higher K in a ceramic material capable of being sintered at a low temperature to permit use of high-silver content buried electrodes. Multilayer ceramic capacitors are otherwise known as monolithic capacitors.

The capability of a MLC capacitor body for being sintered to maturity and high density at low firing temperatures makes it possible to include electrodes of mostly silver and of low precious metal content (e.g. Pd) buried in the ceramic during firing. Sintering cost is consequently reduced by lowering the required sintering temperature and the electrode material costs are even more significantly reduced.

Typically a sintering aid or flux melts at sintering providing a medium in which the process of simultaneous dissolution and recrystallization of the ceramic materials ensue. For example, see U.S. Pat. No. 4,898,844 (Feb. 6, 1990); U.S. Pat. No. 4,120,677 (Oct. 17, 1978); U.S. Pat. No. 4,066,426 (Jan. 3, 1978); and U.S. Pat. No. 3,885,941 (May 27, 1975).

The cadmium silicates make an exceptional flux that does not melt at low sintering temperatures, i.e. below about 1200° C., as is explained in patent U.S. Pat. No. 4,266,265 (May 5, 1981). Ceramic precursors, such as the alkaline-earth-metal titanates, and a cadmium flux will combine at low sintering temperatures, around 1100° C., through a solid diffusion process to form a low melting eutectic cadmium-bearing alkaline-earth metal silicate. This silicate then melts to promote liquid phase sintering. Cadmium fluxes are thus uniquely stable at such low sintering temperatures and unlike other cadmium fluxes do not loose much free cadmium and cadmium oxide to the atmosphere. A more complete description of this process is provided in the above noted U.S. Pat. No. 4,266,265 and this patent is therefore incorporated by reference herein.

Lead zirconate is used in combination with the barium zirconate in most of the examples in the above-noted patent U.S. Pat. No. 4,266,265, whereby the large cation lead reduces the required sintering temperature to the effect that smaller quantities of the sintering flux is required to enable sintering at a low temperature. Typically, double the amount of flux is required when the lead is omitted to obtain the same low sintering temperature, and this greater amount of flux results in a decrease of the dielectric constant. All but two of these ceramic compositions include a very large quantity of lead. The lead zirconate amounts to as much as a quarter of the total composition by weight. This may present a potential environmental threat of lead poisoning both in manufacturing and even in use of the capacitor product, raising the cost and limiting the use of the product. Lead containing relaxor MLC bodies are also much weaker and break easily during surface mounting.

Fine-grained bodies must be made by sintering very fine particle (e.g. 0.2 to 0.7 micron) powders having a high surface energy and such ceramic bodies advantageously sinter at a somewhat lower temperature. In the paper by Hennings et al, entitled *Temperature-Stable Dielectric Based on Chemically Inhomogeneous BaTiO₃*, Journal of the American Ceramics Society, Vol. 67, No. 4, 1984, pages 249–254, it is shown that using 2½ wt % of an additive composed of $NbO_{2.5} \cdot CoO$ with a pure fine grained barium titanate, there was provided an X7R ceramic body with a K of 3000 but required a sintering temperature of 1300° C. Fine-grained bodies of pure barium titanate, having been hot pressed and sintered, have a K of about 3700 and are far from meeting the above Y5V and high K.

To meet the Y5V standard, the K over the operating temperature range of from −30° C. to +85° C. may vary only between −82% and +22% relative to the K at 25° C., and many users require a DF in Y5V bodies that is no greater than 3.5%.

There are described in patents U.S. Pat. No. 5,010,443 (Apr. 23, 1991) and U.S. Pat. No. 5,258,338 (Nov. 2, 1993) low-firing fine grained X7R barium titanate ceramic bodies, i.e. a bodies wherein the average grain size has increased only slightly from that of the start powders and the TCC is very flat (+/−5%) over a wide temperature range (−55° to +125° C.). The bodies include a cadmium silicate sintering aid, or flux. The sintering caused little grain growth because of the intentional inclusion of a grain-growth inhibitor, e.g. niobium, in the start powders. These small grain bodies, in which during sintering there was essentially no reaction of the grain growth inhibitor with the barium titanate, provides a MLC capacitor having a smooth temperature coefficient of capacitance (TCC) meeting the X7R standard and having bodies with a dielectric constant of several thousands.

The above-mentioned patents show the issue dates in parentheses and these patent are assigned to the same assignee as is the present invention.

It is an object of this invention to provide an improved ceramic powder mixture for use in manufacturing an essentially lead-free, high dielectric constant, ceramic body for use in multilayer capacitors capable of being sintered at a the low temperature of 1100° C., the resulting ceramic bodies meeting the Y5V temperature coefficient standard and having a dielectric constant at the Curie temperature of ten thousand or greater.

SUMMARY

A method for making a ceramic powder mixture initially includes preparing a powder mixture having an average particle size of about 1 micron by combining from 96 to 98 mole percent of precursors of a stoichiometric barium zirconate titanate (BZT) wherein zirconium amounts to from 13.5 to 15.0 mole percent, and wherein up to 4 mole % of the barium is replaced by strontium.

There is added to this combination a compound containing from 0.5 to 1.5 mole percent of Curie-point shifter cations, from 1.2 to 2.6 weight percent of a cadmium silicate sintering flux wherein the molar ratio of CdO to $SiO_2$ ranges from 1:1 to 3:1 inclusive, from zero to no more than 0.01 mole percent of Pb, and from zero to 2 mole % of an alkaline earth metal selected from barium, calcium, strontium and combinations thereof to effect in the powder mixture a ratio (A/B) of the large cations (A) to the small cations (B) in the range from 1.024 to 1.035.

This homogenous mixture is then mildly calcined at approximately 700° C. to obtain a powder comprised of agglomerates of the powder mixture wherein each of the agglomerates has essentially the same composition.

Each of the ingredient powders in the mixture have been adjusted within the corresponding ranges stated above to provide a powder mixture capable of being formed into a body that can be fired to maturity at 1100° C., and subsequently annealed at a lower temperature to produce a mature dielectric ceramic body meeting the Y5V standard and having a dielectric constant greater than 10,000 at the Curie temperature.

The ceramic body is thus manufactured by the additional method steps of forming a body of the calcined homogeneous mixture, applying at least two separate electrodes to the body, sintering the body at about 1100° C. in a closed container, and annealing the body at about 1050° C. in an open air atmosphere to provide a mature dielectric ceramic body having a dielectric constant greater than 10,000 at the Curie temperature and meeting the Y5V standard. It is preferred that the fore-mentioned adjusting is additionally to provide in the mature dielectric ceramic body a Curie temperature lying between 0° C. and 20° C., and even better between 5° C. and 15° C.

This invention recognizes that during the low temperature liquid phase sintering facilitated by the cadmium silicate flux, the crystal formation process itself favors both a balance of large cations to small cations in the crystals of the sintered ceramic body and a charge balance in the crystals of allovalent large cations to allovalent small cations. In this BZT formulation, allovalent large cations are those that do not have charge of +2 as do Ba and Zr, and allovalent small cations are those that do not have a charge of +4 as does Ti, Zr, etc.

Extensive reaction and grain growth is made possible here by providing a slight surplus of all large cations to all small cations in the start powder mixture, whereby the most of the excess large cations will be left in the grain boundaries after sintering along with the modified cadmium silicate flux.

The extent to which the additive cations (to BZT) are incorporated in the BZT grains will be determined by those that pair up to achieve balance, i.e. both large to small cation balance and charge balance, the grains will continue to incorporate them and to grow until the available balancing cations are consumed. After sintering, the cations that were initially dissolved in the flux during sintering which could not mate up in a combination that has large-small cation balance and charge balance is left in the grain boundaries. On the other hand, unreacted small cations left in the grain boundaries tend to act as grain growth inhibitors. For example, some of the cadmium from the flux is incorporated in the grains taking with it some niobium and/or displacing some of the barium of the start BZT. The silicate in the grain boundaries is then likely to contain more barium and less cadmium than before sintering. Cadmium when incorporated in the grains has a pronounced downward shifting influence on the Tc in barium titanates, having promoted the incorporation of niobium in the grains. This large-cation surplus also insures that the Curie-point shifter compound (niobium), does not behave as a sintering inhibiter agent as in the X7R ceramic bodies described in the above-mentioned patents U.S. Pat. No. 5,258,338 and U.S. Pat. No. 5,010,443 but rather reacts fully with the zirconate titanate of the start powders in this invention to contribute to a downward shift of the Curie temperature. Thus capacitors made from the prior art powders of the later two mentioned patents exhibit comparatively little shifts in Curie temperature of the barium titanate during the sintering step, and in the process of making them there was little grain growth.

This invention provides a method for making a very high dielectric constant ceramic dielectric with a Curie temperature in the range from about 5° C. to 20° C. employing a dominantly BZT composition having at once a small amount of additives including a cadmium silicate flux and essentially no lead. The BZT with high zirconate content and the carefully balanced additives provide a strongly down-shifted Curie temperature and otherwise make it possible to manufacture such dielectric ceramic bodies without lead that meet the EIA TCC standard Y5V.

BRIEF DESCRIPTION OF THE DRAWING

Table A shows the effect on dielectric properties of varying the amount of zirconium in the BZT start powders.

Table B shows the effect on dielectric properties of varying the types of compounds in the start powders, which compounds will during subsequent sintering form the BZT component of the ceramic.

Table C shows the effect on dielectric properties of varying the composition of the sintering flux in the ceramic composition.

Table D shows the effect on dielectric properties of varying the amount of flux in the ceramic composition.

Table E shows the effect on dielectric properties of varying the amount of barium in the form of barium carbonate or other oxide equivalents in the ceramic composition.

Table F shows the effect on dielectric properties of varying the amount of niobium in the form of niobium oxide or other oxide equivalents in the ceramic composition.

Table G shows the effect on dielectric properties of varying the amount of manganese in the form of manganese oxide or other oxide equivalents in the ceramic composition.

Table H shows the effect on dielectric properties of varying the amount of free silica in the form of silicon dioxide or other oxide equivalents in the ceramic composition.

Table I shows the effect on dielectric properties of substituting lanthanum titanate for niobium oxide in the ceramic composition.

Table J shows the effect on dielectric properties of substituting calcium oxide for barium oxide in the ceramic composition.

Table K shows the effect on dielectric properties of adding strontium titanate to the ceramic composition.

Table L shows the effect on dielectric properties of adding calcium titanate to the ceramic composition.

Table M shows the effect on dielectric properties of varying the amount of additives to the BZT component in the start powders of the ceramic composition.

Table N shows examples of compositions and dielectric properties of multilayer ceramic bodies having been sintered with buried electrodes of 30%/70% palladium/silver.

DESCRIPTION OF THE PREFERRED EMBODIMENTS

Figure 1:
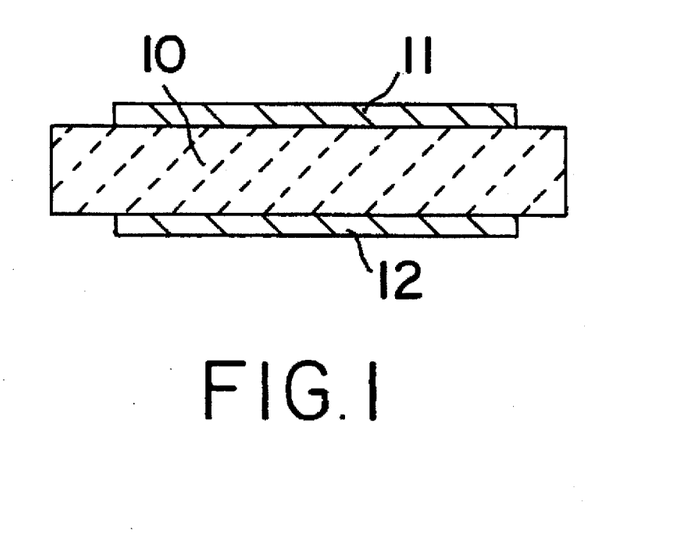
FIG. 1 shows in side sectional view a wafer or disc type ceramic capacitor of this invention.

A number of related experiments, namely Examples 1 through 46, were carried out for producing test capacitors of the disc type as shown in FIG. 1 having a dielectric ceramic body 10 and conductive electrodes on opposite faces of the body 10. The procedure employed in each case entailed forming a mature barium zirconate titanate disc or chip of about 30 mils (0.76 mm) thick and forming electrodes on the two opposite major surfaces of the chip.

The start barium zirconate titanate powder (BZT) in Examples 4, 9–31, 36–37 and 44–48 was a fully co-reacted pure stoichiometric barium zirconate titanate powder. The start barium titanate powder in Examples 1–3, 5–8, 32–35, 38–43 and 49–52 was a mixture, e.g. a mixture of barium titanate (BT) and barium zirconate (BZ), or a mixture of barium titanate (BT) and barium zirconate titanate (BZT), or a mixture of BZT's containing different molar amounts of zirconium, or a mixture of the oxides of barium, zirconium and titanium. A BZT powder having 10 mole percent zirconium is indicated in the data tables as either 10Z*BT or simply as BZT with the zirconium content spelled out below in mole %. The proportion in a mixture of two BZT powders, e.g. 10Z*BZT+20Z*BZT as in Examples 38–40, is indicated by the stated mole % zirconium in the mixture. These start powders in all examples herein were produced by conventional commutation and have an average particle size of about 1 micron.

A start cadmium silicate powder was made by ball milling cadmium oxide (CdO) and silica ($SiO_2$) with an isopropyl alcohol wetting agent and using high density yttria-stabilized zirconia balls in a polyethylene bottle. The milled powder was then dried and calcined at about 950° C., and the resulting calcine was remilled to obtain a calcined powder.

A slip suspension was prepared by mixing 100 parts by weight of the start barium zirconium titanate powder, or powder mixture, with about 1 weight percent of niobium oxide powder $Nb_2O_5$, 1.31 weight percent barium carbonate ($BaCo_3$), 0.1 weight percent manganese carbonate ($MnCo_3$), and 2.02 weight percent of a powdered cadmium silicate sintering flux in an organic vehicle.

The start barium titanate zirconate powder or powder mixture with additives had an average particle size of about 1 micron. These start powders were combined and mixed by ball milling with yttria stabilized zircona balls for 12 hours in a 250 cc polyethylene container.

The resulting slip was cast in a thin layer, dried and granulated to produce a powder, which was then pressed at about 50,000 p.s.i. to form disks having diameters of 0.5 inches (12.7 mm) and a thickness of 30 mils (0.76 mm). The discs were baked to drive off all organic materials. Sintering was accomplished in a closed alumina container at 1100° C. After cooling the discs, a silver electroding paste was applied to the opposite surfaces of the sintered discs which were subsequently heated to 800° C. to cure the electrodes.

The ratio A/B of large cations A and small cations B in the total ceramic start composition is shown in the tables. The dielectric constant K and percent dissipation factor DF were measured at 25° C. and at 1 volt and 1 KHz. The symbol $K_R$ is used to mean K at 25° C. The Curie temperature, Tc, is in centigrade degrees. The temperature coefficient of capacitance (TCC) of a ceramic dielectric is essentially the same as the temperature coefficient of the finished capacitor. The TCC data given in the tables are the percent above and below (−) the value of the dielectric constant at 25° C. at temperatures respectively of −30° C., $T_c$, and 85° C., respectively. Also given are %△K @85° C., % $(K_C-K_R)/K_R$ and %△K @−30° C., where the symbols $K_R$ and $K_C$ mean respectively K at 25° C. and K at Tc. The Electronic Industries Standard designated Y5V requires the K of a dielectric ceramic be no greater than 22% and not below −82% of the K at 25° C. ($K_R$) over this range of temperatures. The highest K for a BZT dielectric is always at the Curie point, and is thus $K_C$.

In Examples 1, 2 and 3 it can be seen that with increasing zirconium the Curie temperature Tc decreases significantly. Also as shown in Table A, although the dielectric constant K is very high in all of the Examples 1, 2 and 3, the peak K (at Tc) is greater than 22 percent higher than the K at 25° C. and does not meet the Y5V standard. The capacitor of Example 1, having 14 mole % zirconium in the BZT start powders, is however much the closest.

It is estimated that a start BZT ceramic dielectric containing 13.5 mole % zirconium could be made to meet the Y5V standard if it included a slightly greater amount of niobium, or other a downward Tc shifting element for compensating the smaller shift in Tc effected by reduction in the zirconium amount. But such compositions can only be marginally good for Y5V applications.

Five groups of experimental disc capacitors designated respectfully as Examples 4, 5, 6, 7 and 8, each included a dozen capacitors for which data is provided in Table B. These capacitors were made in accordance with the above described method that was employed to make the capacitors of three groups designated Examples 1, 2 and 3, except the zirconium is held at 14 mole percent in the barium zirconate titanate start powder for all five examples and the procedure for making the barium zirconate titanate start powder was varied.

In Example 4 of Table B, a fully calcined and co-reacted barium zirconate titanate powder was used. The method for making disc capacitors in Example 5 is exactly as for the capacitors of Example 1 and serves as a control in the Examples 4, 5, 6, 7, and 8 with respect to Examples 1, 2 and 3. The barium zirconate titanate start powder of Example 6 is a mixture of pure barium titanate (BT) and a barium zirconate titanate having 20 mole % zirconium (20Z*BZT) proportioned to contain the desired 14 mole percent zirconium. The barium zirconate titanate start powder of Example 7 is a mixture of a pure barium titanate (BT) and a pure barium zirconate (BZ). The start barium zirconate powder in Example 8 began with a mixture of the oxides of barium, zirconium and titanium. In all cases the average particle size of the mixture was about 1 micron.

In the start powders for making the capacitors of Table B, the additives to the barium zirconate titanate start mixture are all essentially the same in the compositions in this family of five examples, except the niobium content in Examples 4 and 7 is about 5% greater. As will be explained below with respect to Examples 23 to 27, a change in niobium content of 5% is not nearly enough to explain the differences in Examples 6 and 7 regarding Tc, TCC and K. The differences in performance between examples here is dominantly attributable to the different combinations of start compounds for introducing zirconium and titanium to the start mixture, and their very small resulting differences in the ceramic of degree of fullness of the reaction of the components of the start materials after sintering.

Thus in all the Examples 4 through 8 it can be concluded that all of the experimental start materials for forming the BZT heart of the ceramic are viable for making Y5V ceramic dielectric bodies. Specifically, the disc capacitors of Examples 7 and 8 meet the Y5V standard and those of Example 4, within experimental error in the data for $(K_C-K_R)/_R$, are seen capable of meeting the standard also. The ceramic of Example 4 is seen to be most fully reacted and provides the best performance, though not much different from the other four.

The disc capacitors of Examples 9, 10, 11, 12 and 13 for which compositions and electrical performance data are given in Table C, provide a means for assessing the effect of variations in the compositions of the cadmium sintering flux. (Note that Example 11 is the same as Example 2 in Table A.) The trend seen in the series of Examples 9, 10 and 11 is that as the amount of cadmium in the cadmium silicate flux is increased, the Curie temperature Tc is reduced, which is attributable to the fact that for each $Cd^{+1}$ (large cadmium cation of charge +1) that is taken into the grains, there must be for charge balance an equal molar amount of a small cation of +5, and niobium meets that description and is available. The niobium that accompanies the cadmium into the grains acts as a strong shifter of the Curie temperature, in the downward direction. Further increases in cadmium content as in Example 12 has little effect, which indicates that the BZT grains have taken in all the cadmium that they can, i.e. exceeding the saturation limit.

The borate flux of Example 13 produces a dramatic reduction in K because, explained in the above-mentioned patent U.S. Pat. No. 4,266,265, boron flux tends to totally envelope each ceramic grain during sintering, which when cooled leaves a low K film around each grain and so separates the grains and reduces the dielectric of the ceramic body. On the other hand, the inter-granular cadmium flux tends to ball up at only the largest points between the grains.

Although the performance of only Example 9 in Table C meets the Y5V standard, the ceramic dielectric bodies of Examples 10 through 12 have a high K, a much reduced Tc and thus a lower DF. Their failure to have a low enough $(K_C-K_R)/K_R$ causes them to fall outside the Y5V standard. However, using the more cadmium rich fluxes of Examples 10, 11 and 12, and making only small changes in these examples in the amounts of zirconium, niobium and the total amount of flux toward those used in Example 14 of Table D, the Y5V standard can be met.

These cadmium richer fluxes are thus preferred, and it is concluded from the data provided herein and from other experience that no less than 1.2 weight percent of the flux will be necessary for sintering these bodies to maturity at 1100° C.

It is also concluded that it will not be possible in this BZT system to achieve Y5V performance with high dielectric constants when the cadmium flux content exceeds about 2.6 weight percent. Higher flux content tends to contribute more low K intergranular material to the detriment of high dielectric constant and at the same time begins to degrade the life test performance, particularly insulation resistance.

The theme of charge balance and cation ratio is pursued further in the examples of Tables D and E. In Table D the effects of the amount of flux are shown, and in Table E the amount of BaCO3 additive is changed, both of which alter the charge balance and the cation ratio.

Referring to Table D, Examples 14, 15, 16 and 17, only the amount of flux is changed. As the amount of the cadmium silicate flux is increased the Curie temperature decreases and A/B increases. The higher A/B implies a larger amount of intergranular material which is consistent with the trend toward lower dielectric constant at Curie temperature. But these data indicate that amounts of flux ranging from 1.2 to 2.6 weight percent can be included for making Y5V ceramic bodies with $K_C$ greater than 10,000.

In examples 18, 19, 20, 21 and 22 for which data is shown in Table E, the amount of the barium carbonate is varied while all other components of the composition are held fixed. The most important result here is the need for just the right amount of the added large barium ions to achieve charge balance for obtaining maximum grain growth and a high dielectric constant. This added barium is designed to render the large to small cation ratio A/B greater than unity and most importantly to react at sintering (1100° C.) by solid diffusion with the cadmium silicate flux. The melting temperature of the so reacted barium and flux is thereby reduced to well below the sintering temperature rendering it highly fluid and effective in its central role as the liquid vehicle in the ensuing sintering process of dissolution of some of the additives and recrystallization of the barium zirconate titanate. It is that process that makes it possible for the BZT grains to take in large cations (e.g. Ba, Ca, Sr, Cd, La, etc.) and small cations (e.g. Ti, Zr, Nb, Ta, etc.) from the start powder additives to the start BZT powder components.

Returning to the data in Table E, when as in Examples 20 and 21, the $BaCo_3$ additive amounts to from 1.58 to 1.84 mole % of the composition, the dielectric constant at the Curie temperature ($K_C$) just exceeds the dielectric constant at 25° C. ($K_R$), and thus the Y5V limit of 22%. The TCC of the remaining examples in Table E is within the Y5V standard.

The effect of very small increases of niobium to the start powder additives, is seen to strongly reduce the Curie temperature and raise the dielectric constant in the series of Examples 23, 24 and 25 of Table F. However, further small increases in niobium illustrated by the data for Examples 26 and 27 reverse those trends. These further increases in niobium exceed the amounts that can be paired up with the barium carbonate additive and are left in the grain boundaries to function as a grain growth inhibitor. The adjustments in the additive barium (Table E) and in the additive niobium (Table F) are seen to be especially critical for achieving high K and Y5V performance.

In the Examples 16, 28 and 29 for which data is shown in Table G, the manganese carbonate additive is varied over the range from 0.21 to 0.63 mole percent of the composition. As the amount of MnCO3 increases the dielectric constant drops strongly and the Curie temperature becomes less and less shifted downward suggesting that manganese inhibits reaction of niobium and zirconium with barium titanate in amounts exceeding about 0.6 mole percent.

In Examples 30 and 31, for which data is shown in Table H, the effects of the addition of small amounts of silica are seen to dramatically degrade performance, and the amount of free silica in the powder mixture should be limited to a maximum of 0.05 weight percent. The high Tc and low K values at Tc are indicative of diminished reaction of additives at sintering and in the case of Example 31 sintering did not even go to completion.

In the Example 32 for which data is shown in Table I, niobium, the small cation Curie-point shifter, and the barium carbonate additive of the foregoing Examples have been omitted and the large cation lanthanum Curie-point shifter, lanthanum, is added as lanthanum titanate. The lanthanum titanate additive amounts to 0.69 mole percent, the same mole % of niobium that was added in ten of the foregoing Examples.

Example 32 includes no additive $BaCO_3$ whereas Examples 33, 34 and 35 have increasing amounts of barium carbonate. The zirconium content is 14.5 mole %, is higher than in most examples described above, and this higher zirconium causes a greater decrease in the Curie temperature. The A/B ratio is greater than unity, i.e. is 1.030, which is only attributable to the cadmium of the flux. Note that the Tc is unchanged for all examples.

Unlike for the addition of the small cation niobium ($Nb^{+5}$), there will not be any change in the large to small ratio A/B or in charge balance attributable to the addition of $La_2Ti_2O_7$ since for every large lanthanum cation ($La^{+3}$) entering the barium titanate ($Ba^{+2}$ and $Ti^{+4}$) lattice there will be one small titanium cation ($Ti^{+4}$).

The disc capacitors of Examples 1 and 32 provide about the same performance, having a high K and meeting the Y5V standard.

The Examples 36 and 37, for which data is shown in Table J, show the different effects on performance, respectively, of an addition of barium carbonate and an addition of the same molar amount of calcium carbonate. There is a reduced K with the calcium additive which in certain situations may be used to bring down the dielectric constant at the Curie point so that $(K_C-K_R)/K_R$ is reduced to conform to the Y5V standard.

However, in Examples 38, 39 and 40 for which data is shown in Table K, it is seen in that increasing amounts of strontium cause a strong decrease in Tc and a degrading effect on the dielectric constant, although the dielectric constant $K_C$ is in all three cases is greater than 10,000. These capacitors show that useful compromise between dielectric constant and Curie-point shifting using strontium is possible, and Y5V performance is achievable with high K values using a strontium additive. It is concluded that up to 4 mole percent strontium, substituted for barium in the BZT start powders, may be advantageous. Thus up to 4 mole $SrTiO_3$ or $SrZrTiO_3$ may be combined with and considered a component of the BZT start powders.

In Examples 41, 42 and 43 for which data is shown in Table L, calcium titanate is added in varying amounts in the composition of the capacitors of Example 2. This results in a further reduction in dielectric constant but these capacitors handily meet the Y5V standard for TCC. Although good Y5V performance is achieved, high K compositions of this invention excluding calcium are preferred.

In Examples 44, 45 and 46 for which data is shown in Table M, the effects of varying amounts of total additives to the barium zirconium titanate is demonstrated. With less than a total of 3 mole percent additives in Example 44 excellent Y5V disc capacitors with high K are produced. Only 0.58 mole percent of the cadmium silicate flux is used and the high Tc of 15° C. compared to the Tc of the other examples suggests that a somewhat less than full reaction occurred at sintering in Example 44. The lower K and higher Tc also suggest that some of the barium from the $BaCO_3$ and some of the niobium that did not react are left with the silicate in the grain boundaries, because larger amounts of unreacted material in the grain boundaries reduces the dielectric constant. It is concluded that no more than 5 weight % additives should be used.

Monolithic test capacitors of Examples 47, 48, 49, 50, 51, 52 and 54 were made using the start powder mixture for which the ingredients are shown in Table N. The barium titanate start powder is mixed with the cadmium silicate flux, $BaCO_3$, $Nb_2O_5$, $MnCO_3$ and $La_2Ti_2O_7$ were combined in an organic vehicle and binder medium. The organic vehicle consisted of xylene and N-butanol in a 70/30 weight ratio respectively. The binder medium was a poly vinyl butyryl. This slurry contained by weight 50% of the solvent (the vehicle), 9% binder, a few percent organic dispersant and plasticizer, and the mixture of start ceramic powders. The slurry was milled for about six hours to assure homogeneity of the start powders.

Figure 2:
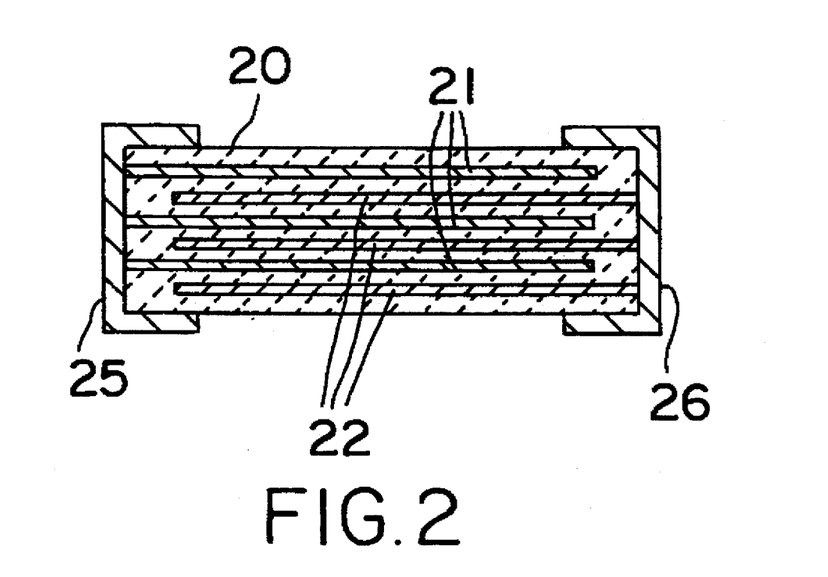
FIG. 2 shows in side sectional view a monolithic or multilayer ceramic capacitor (MLC) of this invention.

In the process for making monolithic capacitors, successive coatings of the milled slurry were applied over a glass substrate, drying each layer in turn and screen printing an electroding paste of 70% silver and 30% palladium to the cast dried layer. Before applying the next successive dielectric layer, the underlying screened pattern of electroding paste was dried. The body 20, as shown in FIG. 2 with buried electrodes 21 and 22, was cut from the stack and was fired to maturity in a closed crucible at 1100° C. for 2½ hours.

Added to this process was an annealing step, performed after firing in a closed crucible at 1100° C. for 3 hours. The anneal was conducted in open air at 1050° C. for 2 hours with the purpose of removing any elemental cadmium or silver that may remain in the grain boundaries. A silver paste was then applied to either end of body 20 at which edges of the buried electrodes were exposed, and the body was fired at 75° C. for a few minutes to form silver terminations 25 and 26.

In monolithic capacitors having thin active dielectric layers less than 20 microns, the annealing step is especially effective toward causing an increase in the dielectric constant with no significant change in the TCC. The anneal also provides improved life test performance that is most effective in monolithic capacitors with such thin active dielectric layers.

Composition, structure and performance data for the monolithic capacitors of Examples 47 through 52 are shown in Table N. The distance through the ceramic dielectric layer between adjacent buried electrodes (AD thickness) is shown for each group of monolithic capacitors in Table N. Thin dielectric layers i.e. low AD thickness, in multilayer ceramic capacitors generally leads to higher K and higher DF compared with disc capacitors for a given ceramic start composition. The higher K is attributable to the fact that it is traditional to measure all capacitors at 1 volt (and at 1 KHz), and the much higher volts per unit thickness of the dielectric in a MLC produces in ferroelectric ceramics a higher K. The higher DF obtained in an MLC is attributable to the fact that the dielectric layers between adjacent buried electrodes in the MLC capacitor are much thinner than in a disc capacitor. Since it is standard practice to measure DF (and other parameters) at the same voltage for all kinds of capacitors, the thin MLC dielectric layer experiences a much higher exciting voltage per unit of thickness. It is well known, that in ferroelectric ceramic dielectrics, the DF increases sharply (at 20° C.) as a function of the applied voltage. This can be seen by comparing the data for the disc capacitors of Example 1 (Table A) with that of the MLC's of Example 50, and also by comparing the data in Examples 33 (Table I) with that of Example 52. There is also a tendency for the Tc of a MLC to be a few degrees higher than its counterpart disc capacitor made with the same start powders.

However, it is common practice to first experiment with the much more easily constructed disc capacitors for guidance in learning how to improve the performance of multilayer capacitors.

The capacitors of Examples 47 and 49 were made with the same start powders except the start 14 mole percent BZT of Example 47 was fully reacted while for Example 47 the start 14 mole percent zirconium BZT was a mixture of 10% percent and 20% zirconium BZT powders. The start BZT powder of Example 50 was a mixture of 10% and 20% zirconium BZT powders proportioned to give a 15% zirconium BZT. In Examples 47 and 49, the dielectric constant K exceeds 24,000 at Tc and Tc is very near room temperature of 25° C. The TCC of Examples 47 and 49 very nearly meets the Y5V standard. In Example 50 the K is lower, the Tc is much lower at 5° C. and the Y5V standard is not met since at $T_c$ the K is over 22% that at 25° C. It can be seen here that niobium is a more effective Curie point shifter than is lanthanum.

Capacitors of this invention, and thus the start powders used in the capacitors, are easily distinguished in the Tables as those capacitors having a dielectric constant at the Curie temperature, $K_C$, that is at least 10,000 and that simultaneously have a temperature coefficient of dielectric constant the complies with the Y5V standard, denoted by "YES", or alternatively "[YES]" meaning that it marginally meets the standard within experimental accuracy. From this data it is also observed that the Curie temperature for all those of the examples of this invention are always from 5° C. to 20° C., which further helps to distinguish the invention.

The experimental data provided herein show how very difficult it is, and how composition critical it is, to provide a ceramic body with a high dielectric constant (K), i.e. 10,000 or greater, as well as a Y5V temperature coefficient, without lead being included in the start powder. Success is realized using a barium zirconate titanate (BZT) combined with a maximum of 5 weight percent additives, wherein the zirconium preferably amounts to about 14.5 mole percent of the combination. The critical combination of additives are a small amount of a cadmium silicate sintering flux, about 1 mole % of a Curie point shifting cation, preferably niobium or lanthanum, and from zero to 2 mole % of an alkaline earth metal to effect a ratio of large to small cations of from 1.024 to 1.035 in the total composition.

And it is essential that the start powders have an average particle size of about 1 micron because substantial grain growth during sintering is essential to achieve high dielectric constants. Thus most of the particles in the start powders must be large enough that they will not completely dissolve in the molten sintering flux and will remain available as nuclei for the required grain growth. Such powders may be of the low cost conventionally comminuted type, as opposed to the expensive very fine spherical-particle powders required for making other smooth TCC ceramic bodies with high dielectric constant. Mature ceramic Y5V bodies of this invention have average grain sizes of no less than 3 microns.

TABLE A

Effect of Amount of Zr

| Example | 1 | | 2 | | 3 | |
|---|---|---|---|---|---|---|
| BZT Powder | 10Z*BT + 20Z*BT | | 10Z*BT + 20Z*BT | | 10Z*BT + 20Z*BT | |
| mole % Zr | 14 | | 15 | | 16 | |
| Flux | 5CdO.2SiO$_2$ | | 5CdO.2SiO$_2$ | | 5CdO.2SiO$_2$ | |
| A/B ratio | 1.031 | | 1.031 | | 1.031 | |
| | Wt basis | Mole basis | Wt basis | Mole basis | Wt basis | Mole basis |
| BZT Powder | 100.00 | 100.00 | 100.00 | 100.00 | 100.00 | 100.00 |
| Flux | 2.02 | 0.63 | 2.02 | 0.64 | 2.02 | 0.64 |
| BaCO$_3$ | 1.31 | 1.59 | 1.31 | 1.59 | 1.31 | 1.59 |
| Nb$_2$O$_5$ | 0.76 | 0.68 | 0.76 | 0.69 | 0.76 | 0.69 |
| MnCO$_3$ | 0.10 | 0.21 | 0.1 | 0.21 | 0.10 | 0.21 |
| K @ 25° C. = $K_R$ | 13170 | | 9968 | | 8000 | |
| K @ $T_C$ = $K_C$ | 17384 | | 16547 | | 16400 | |
| $(K_{-30° C.} - K_R)/K_R \times 100\%$ | −80 | | −63 | | −17 | |
| $(K_C - K_R)/K_R \times 100\%$ | 32 | | 66 | | 105 | |
| $(K_{85° C.} - K_R)/K_R \times 100\%$ | −80 | | −77 | | −73 | |
| $T_C$ °C. | 10 | | 0 | | −10 | |
| % DF | 0.25 | | 0.16 | | 0.12 | |
| Density gm/cc | 5.82 | | 5.82 | | 5.82 | |
| Y5V | NO | | NO | | NO | |

TABLE B

Effect of various BZT start powder compositions

| Example | 4 | | 5 | | 6 | | 7 | | 8 | |
|---|---|---|---|---|---|---|---|---|---|---|
| BZT Powder | 14% BZT | | 10Z*BT + 20Z*BT | | BT + 20Z*BT | | BT + BZ | | Mixed Oxide | |
| mole % Zr | 14 | | 14 | | 14 | | 14 | | 14 | |
| Flux | 5CdO.2SiO$_2$ | | 5CdO.2SiO$_2$ | | 5CdO.2SiO$_2$ | | 5CdO.2SiO$_2$ | | 5CdO.2SiO$_2$ | |
| A/B ratio | 1.030 | | 1.031 | | 1.031 | | 1.030 | | 1.031 | |
| | Wt basis | Mole basis | Wt basis | Mole basis | Wt basis | Mole basis | Wt basis | Mole basis | Wt basis | Mole basis |
| BZT Powder | 100.00 | 100.00 | 100.00 | 100.00 | 100.00 | 100.00 | 100.00 | 100.00 | 100.00 | 100.00 |
| Flux | 2.00 | 0.63 | 2.02 | 0.63 | 2.02 | 0.63 | 2.00 | 0.63 | 2.02 | 0.63 |
| BaCO$_3$ | 1.30 | 1.58 | 1.31 | 1.59 | 1.31 | 1.59 | 1.30 | 1.58 | 1.31 | 1.59 |

TABLE B-continued

| | | | | | | | | | | |
|---|---|---|---|---|---|---|---|---|---|---|
| $Nb_2O_5$ | 0.80 | 0.72 | 0.76 | 0.68 | 0.76 | 0.68 | 0.80 | 0.72 | 0.76 | 0.68 |
| $MnCO_3$ | 0.10 | 0.21 | 0.10 | 0.21 | 0.10 | 0.21 | 0.10 | 0.21 | 0.10 | 0.21 |
| K @ 25° C. = $K_R$ | 14592 | | 13170 | | 9813 | | 13344 | | 13156 | |
| K @ $T_C$ = $K_C$ | 17948 | | 17384 | | 12953 | | 15879 | | 14735 | |
| $(K_{-30° C.} - K_R)/K_R \times 100\%$ | −79 | | −80 | | −74 | | −78 | | −81 | |
| $(K_C - K_R)/K_R \times 100\%$ | 23 | | 32 | | 32 | | 19 | | 12 | |
| $(K_{85° C.} - K_R)/K_R \times 100\%$ | −79 | | −80 | | −75 | | −75 | | −78 | |
| $T_C$ °C. | 12 | | 10 | | 5 | | 10 | | 15 | |
| % DF | 0.24 | | 0.25 | | 0.24 | | 0.41 | | 0.4 | |
| Density gm/cc | 5.95 | | 5.82 | | 5.94 | | 5.81 | | 5.81 | |
| Y5V | [Yes] | | NO | | NO | | YES | | YES | |

TABLE C

Effect of Type of Flux

| Example | 9 | | 10 | | 11 | | 12 | | 13 | |
|---|---|---|---|---|---|---|---|---|---|---|
| BZT Powder | 10Z*BT + 20Z*BT | | 10Z*BT + 20Z*BT | | 10Z*BT + 20Z*BT | | 10Z*BT + 20Z*BT | | 14% BZT | |
| mole % Zr | 14.5 | | 15 | | 15 | | 15 | | 14 | |
| Flux | $CdO.SiO_2$ | | $2CdO.SiO_2$ | | $5CdO.2SiO_2$ | | $3CdO.SiO_2$ | | $CdO.2ZnO.B_2O_3$ | |
| A/B ratio | 1.025 | | 1.030 | | 1.031 | | 1.032 | | 1.038 | |
| | Wt basis | Mole basis | Wt basis | Mole basis | Wt basis | Mole basis | Wt basis | Mole basis | Wt basis | Mole basis |
| BZT Powder | 100.00 | 100.00 | 100.00 | 100.00 | 100.00 | 100.00 | 100.00 | 100.00 | 100.00 | 100.00 |
| Flux | 2.02 | 2.57 | 2.02 | 1.53 | 2.02 | 0.63 | 2.02 | 1.09 | 2.00 | 1.33 |
| $BaCO_3$ | 1.31 | 1.59 | 1.31 | 1.59 | 1.31 | 1.59 | 1.31 | 1.59 | 1.30 | 1.58 |
| $Nb_2O_5$ | 0.76 | 0.68 | 0.76 | 0.68 | 0.76 | 0.68 | 0.76 | 0.68 | 0.80 | 0.72 |
| $MnCO_3$ | 0.10 | 0.21 | 0.10 | 0.21 | 0.10 | 0.21 | 0.10 | 0.21 | 0.10 | 0.21 |
| K @ 25° C. = $K_R$ | 10395 | | 12107 | | 9968 | | 11089 | | 4200 | |
| K @ $T_C$ = $K_C$ | 11019 | | 17071 | | 16547 | | 17410 | | 4326 | |
| $(K_{-30° C.} - K_R)/K_R \times 100\%$ | −74 | | −66 | | −63 | | −66 | | −37 | |
| $(K_C - K_R)/K_R \times 100\%$ | 6 | | 41 | | 66 | | 57 | | 3 | |
| $(K_{85° C.} - K_R)/K_R \times 100\%$ | −73 | | −76 | | −77 | | −76 | | −57 | |
| $T_C$ °C. | 16 | | 5 | | 0 | | 0 | | 10 | |
| % DF | 0.93 | | 0.28 | | 0.16 | | 0.29 | | 0.5 | |
| Density gm/cc | 5.55 | | 5.87 | | 5.82 | | 5.89 | | 5.72 | |
| Y5V | YES | | NO | | NO | | NO | | YES | |

TABLE D

Effect of amount of flux

| Example | 14 | | 15 | | 16 | | 17 | |
|---|---|---|---|---|---|---|---|---|
| BZT Powder | 14% BZT | | 14% BZT | | 14% BZT | | 14% BZT | |
| mole % Zr | 14 | | 14 | | 14 | | 14 | |
| Flux | $5CdO.2SiO_2$ | | $5CdO.2SiO_2$ | | $5CdO.2SiO_2$ | | $5CdO.2SiO_2$ | |
| A/B ratio | 1.024 | | 1.027 | | 1.030 | | 1.033 | |
| | Wt basis | Mole basis | Wt basis | Mole basis | Wt basis | Mole basis | Wt basis | Mole basis |
| BZT Powder | 100.00 | 100.00 | 100.00 | 100.00 | 100.00 | 100.00 | 100.00 | 100.00 |
| Flux | 1.60 | 0.50 | 1.80 | 0.57 | 2.00 | 0.63 | 2.20 | 0.69 |
| $BaCO_3$ | 1.30 | 1.58 | 1.30 | 1.58 | 1.30 | 1.58 | 1.30 | 1.58 |
| $Nb_2O_5$ | 0.80 | 0.72 | 0.80 | 0.72 | 0.80 | 0.72 | 0.80 | 0.72 |
| $MnCO_3$ | 0.10 | 0.21 | 0.10 | 0.21 | 0.10 | 0.21 | 0.10 | 0.21 |
| K @ 25° C. = $K_R$ | 15523 | | 14315 | | 14143 | | 12857 | |
| K @ $T_C$ = $K_C$ | 18162 | | 18037 | | 17396 | | 17357 | |
| $(K_{-30° C.} - K_R)/K_R \times 100\%$ | −83 | | −80 | | −79 | | −76 | |
| $(K_C - K_R)/K_R \times 100\%$ | 17 | | 26 | | 23 | | 35 | |
| $(K_{85° C.} - K_R)/K_R \times 100\%$ | −72 | | −71 | | −79 | | −72 | |
| $T_C$ °C. | 15 | | 12 | | 12 | | 10 | |

TABLE D-continued

| % DF | 0.42 | 0.33 | 0.29 | 0.29 |
|---|---|---|---|---|
| Density gm/cc | 5.91 | 5.9 | 5.92 | 5.88 |
| Y5V | [YES] | NO | [YES] | NO |

TABLE E

Effect of amount of $BaCO_3$

| Example | 18 | | 19 | | 20 | | 21 | | 22 | |
|---|---|---|---|---|---|---|---|---|---|---|
| BZT Powder | 14% BZT | | 14% BZT | | 14% BZT | | 14% BZT | | 14% BZT | |
| mole % Zr | 14 | | 14 | | 14 | | 14 | | 14 | |
| Flux | 5CdO.2SiO$_2$ | | 5CdO.2SiO$_2$ | | 5CdO.2SiO$_2$ | | 5CdO.2SiO$_2$ | | 5CdO.2SiO$_2$ | |
| A/B ratio | 1.026 | | 1.028 | | 1.030 | | 1.033 | | 1.035 | |
|  | Wt basis | Mole basis | Wt basis | Mole basis | Wt basis | Mole basis | Wt basis | Mole basis | Wt basis | Mole basis |
| BZT Powder | 100.00 | 100.00 | 100.00 | 100.00 | 100.00 | 100.00 | 100.00 | 100.00 | 100.00 | 100.00 |
| Flux | 2.00 | 0.63 | 2.00 | 0.63 | 2.00 | 0.63 | 2.00 | 0.63 | 2.00 | 0.63 |
| BaCO$_3$ | 0.97 | 1.18 | 1.13 | 1.37 | 1.30 | 1.58 | 1.52 | 1.84 | 1.73 | 2.10 |
| Nb$_2$O$_5$ | 0.80 | 0.72 | 0.80 | 0.72 | 0.80 | 0.72 | 0.80 | 0.72 | 0.80 | 0.72 |
| MnCO$_3$ | 0.10 | 0.21 | 0.10 | 0.21 | 0.10 | 0.21 | 0.10 | 0.21 | 0.10 | 0.21 |
| K @ 25° C. = $K_R$ | 9308 | | 8916 | | 14585 | | 14601 | | 13504 | |
| K @ $T_C$ = $K_C$ | 11170 | | 10520 | | 18524 | | 18105 | | 16340 | |
| ($K_{-30° C.}$ − $K_R$)/$K_R$ × 100% | −58 | | −62 | | −80 | | −81 | | −73 | |
| ($K_C$ − $K_R$)/$K_R$ × 100% | 20 | | 18 | | 27 | | 24 | | 21 | |
| ($K_{85° C.}$ − $K_R$)/$K_R$ × 100% | −69 | | −68 | | −80 | | −79 | | −73 | |
| $T_C$ °C. | 12 | | 12 | | 13 | | 14 | | 13 | |
| % DF | 0.26 | | 0.4 | | 0.33 | | 0.34 | | 0.43 | |
| Density gm/cc | 5.93 | | 5.94 | | 5.97 | | 5.93 | | 5.94 | |
| Y5V | YES | | YES | | NO | | [YES] | | YES | |

TABLE F

Effect of amount of $Nb_2O_5$

| Example | 23 | | 24 | | 25 | | 26 | | 27 | |
|---|---|---|---|---|---|---|---|---|---|---|
| BZT Powder | 14% BZT | | 14% BZT | | 14% BZT | | 14% BZT | | 14% BZT | |
| mole % Zr | 14 | | 14 | | 14 | | 14 | | 14 | |
| Flux | 5CdO.2SiO$_2$ | | 5CdO.2SiO$_2$ | | 5CdO.2SiO$_2$ | | 5CdO.2SiO$_2$ | | 5CdO.2SiO$_2$ | |
| A/B ratio | 1.034 | | 1.032 | | 1.030 | | 1.028 | | 1.026 | |
|  | Wt basis | Mole basis | Wt basis | Mole basis | Wt basis | Mole basis | Wt basis | Mole basis | Wt basis | Mole basis |
| BZT Powder | 100.00 | 100.00 | 100.00 | 100.00 | 100.00 | 100.00 | 100.00 | 100.00 | 100.00 | 100.00 |
| Flux | 2.00 | 0.63 | 2.00 | 0.63 | 2.00 | 0.63 | 2.00 | 0.63 | 2.00 | 0.63 |
| BaCO$_3$ | 1.30 | 1.58 | 1.30 | 1.58 | 1.30 | 1.58 | 1.30 | 1.58 | 1.30 | 1.58 |
| Nb$_2$O$_5$ | 0.61 | 0.55 | 0.70 | 0.63 | 0.80 | 0.72 | 0.90 | 0.81 | 1.01 | 0.91 |
| MnCO$_3$ | 0.10 | 0.21 | 0.10 | 0.21 | 0.10 | 0.21 | 0.10 | 0.21 | 0.10 | 0.21 |
| K @ 25° C. = $K_R$ | 9037 | | 12599 | | 13607 | | 8624 | | 4430 | |
| K @ $T_C$ = $K_C$ | 9941 | | 15371 | | 17689 | | 9659 | | 4651 | |
| ($K_{-30° C.}$ − $K_R$)/$K_R$ × 100% | −60 | | −76 | | −75 | | −57 | | −23 | |
| ($K_C$ − $K_R$)/$K_R$ × 100% | 10 | | 22 | | 30 | | 12 | | 5 | |
| ($K_{85° C.}$ − $K_R$)/$K_R$ × 100% | −68 | | −76 | | −77 | | −66 | | −34 | |
| $T_C$ °C. | 15 | | 13 | | 10 | | 13 | | 5 to 20 | |
| % DF | 0.64 | | 0.58 | | 0.56 | | 3.42 | | 2.31 | |
| Density gm/cc | 6.03 | | 5.98 | | 5.98 | | 5.92 | | 5.82 | |
| Y5V | YES | | YES | | NO | | YES | | YES | |

TABLE G

Effect of amount of $MnCO_3$

| Example | 16 | | 28 | | 29 | |
|---|---|---|---|---|---|---|
| BZT Powder | 14% BZT | | 14% BZT | | 14% BZT | |
| mole % Zr | 14 | | 14 | | 14 | |
| Flux | $5CdO.2SiO_2$ | | $5CdO.2SiO_2$ | | $5CdO.2SiO_2$ | |
| A/B ratio | 1.030 | | 1.028 | | 1.026 | |
| | Wt basis | Mole basis | Wt basis | Mole basis | Wt basis | Mole basis |
| BZT Powder | 100.00 | 100.00 | 100.00 | 100.00 | 100.00 | 100.00 |
| Flux | 2.00 | 0.63 | 2.00 | 0.63 | 2.00 | 0.63 |
| $BaCO_3$ | 1.30 | 1.58 | 1.30 | 1.58 | 1.30 | 1.58 |
| $Nb_2O_5$ | 0.80 | 0.72 | 0.80 | 0.72 | 0.80 | 0.72 |
| $MnCO_3$ | 0.10 | 0.21 | 0.21 | 0.44 | 0.30 | 0.63 |
| K @ 25° C. = $K_R$ | 14143 | | 11110 | | 8676 | |
| K @ $T_C$ = $K_C$ | 17396 | | 11999 | | 8676 | |
| $(K_{-30°C.} - K_R)/K_R \times 100\%$ | −79 | | −75 | | −70 | |
| $(K_C - K_R)/K_R \times 100\%$ | 23 | | 8 | | 0 | |
| $(K_{85°C.} - K_R)/K_R \times 100\%$ | −79 | | −75 | | −69 | |
| $T_C$ °C. | 12 | | 15 | | 20 | |
| % DF | 0.29 | | 0.3 | | 0.48 | |
| Density gm/cc | 5.92 | | 5.89 | | 5.88 | |
| Y5V | [YES] | | YES | | YES | |

TABLE H

Effect of $SiO_2$

| Example | 30 | | 31 | |
|---|---|---|---|---|
| BZT Powder | 14% BZT | | 14% BZT | |
| mole % Zr | 14 | | 14 | |
| Flux | $5CdO.2SiO_2$ | | $5CdO.2SiO_2$ | |
| A/B ratio | 1.030 | | 1.030 | |
| | Wt basis | Mole basis | Wt basis | Mole basis |
| BZT Powder | 100.00 | 100.00 | 100.00 | 100.00 |
| Flux | 2.00 | 0.63 | 2.00 | 0.63 |
| $BaCO_3$ | 1.30 | 1.58 | 1.30 | 1.58 |
| $Nb_2O_5$ | 0.80 | 0.72 | 0.80 | 0.72 |
| $MnCO_3$ | 0.10 | 0.21 | 0.10 | 0.21 |
| $SiO_2$ | 0.20 | 0.80 | 0.50 | 1.99 |
| K @ 25° C. = $K_R$ | 2500 | | 7456 | |
| K @ $T_C$ = $K_C$ | 2500 | | 7605 | |
| $(K_{-30°C.} - K_R)/K_R \times 100\%$ | −31 | | −74 | |
| $(K_C - K_R)/K_R \times 100\%$ | 0 | | 2 | |
| $(K_{85°C.} - K_R)/K_R \times 100\%$ | −41 | | −74 | |
| $T_C$ °C. | 20 | | 17 | |
| % DF | | | 0.69 | |
| Density gm/cc | 5.85 | | 5.98 | |
| Y5V | YES | | YES | |

TABLE I

Substitution of $La_2Ti_2O_7$ for $Nb_2O_5$

| Example | 32 | 33 | 34 | 35 |
|---|---|---|---|---|
| BZT Powder | 10Z*BT + 20Z*BT | 10Z*BT + 20Z*BT | 10Z*BT + 20Z*BT | 10Z*BT + 20Z*BT |
| mole % Zr | 14.5 | 14.5 | 14.5 | 14.5 |
| Flux | $5CdO.2SiO_2$ | $5CdO.2SiO_2$ | $5CdO.2SiO_2$ | $5CdO.2SiO_2$ |
| A/B ratio | 1.029 | 1.031 | 1.034 | 1.038 |

TABLE I-continued

|  | Wt basis | Mole basis | Wt basis | Mole basis | Wt basis | Mole basis | Wt basis | Mole basis |
|---|---|---|---|---|---|---|---|---|
| BZT Powder | 100.00 | 100.00 | 100.00 | 100.00 | 100.00 | 100.00 | 100.00 | 100.00 |
| Flux | 2.02 | 0.63 | 2.02 | 0.63 | 2.02 | 0.63 | 2.02 | 0.63 |
| $BaCO_3$ | 0.00 | 0.00 | 0.19 | 0.23 | 0.38 | 0.46 | 0.76 | 0.92 |
| $Nb_2O_5$ | 0.00 | 0.00 | 0.00 | 0.00 | 0.00 | 0.00 | 0.00 | 0.00 |
| $MnCO_3$ | 0.10 | 0.21 | 0.10 | 0.21 | 0.10 | 0.21 | 0.10 | 0.21 |
| $La_2Ti_2O_7$ | 1.39 | 0.69 | 1.39 | 0.69 | 1.39 | 0.69 | 1.39 | 0.69 |
| K @ 25° C. = $K_R$ | 15600 | | 12831 | | 11093 | | 7175 | |
| K @ $T_C$ = $K_C$ | 17160 | | 14627 | | 12424 | | 7677 | |
| $(K_{-30° C.} - K_R)/K_R \times 100\%$ | −80 | | −77 | | −71 | | −55 | |
| $(K_C - K_R)/K_R \times 100\%$ | 10 | | 14 | | 12 | | 7 | |
| $(K_{85° C.} - K_R)/K_R \times 100\%$ | −79 | | −75 | | −73 | | −59 | |
| $T_C$ °C. | 15 | | 15 | | 15 | | 15 | |
| % DF | 0.39 | | 0.45 | | 0.48 | | 0.71 | |
| Density gm/cc | 5.86 | | 5.9 | | 5.94 | | 5.95 | |
| Y5V | YES | | YES | | YES | | YES | |

TABLE J

Effect of $CaCO_3$

| Example | 36 | 37 |
|---|---|---|
| BZT Powder | 14% BZT | 14% BZT |
| mole % Zr | 14 | 14 |
| Flux | $5CdO.2SiO_2$ | $5CdO.2SiO_2$ |
| A/B ratio | 1.030 | 1.030 |

|  | Wt basis | Mole basis | Wt basis | Mole basis |
|---|---|---|---|---|
| BZT Powder | 100.00 | 100.00 | 100.00 | 100.00 |
| Flux | 2.00 | 0.63 | 2.00 | 0.63 |
| $BaCO_3$ | 1.30 | 1.58 | 0.00 | 0.00 |
| $CaCO_3$ | 0.00 | 0.00 | 0.65 | 1.56 |
| $Nb_2O_5$ | 0.80 | 0.72 | 0.80 | 0.72 |
| $MnCO_3$ | 0.10 | 0.21 | 0.10 | 0.21 |

TABLE J-continued

Effect of $CaCO_3$

| Example | 36 | 37 |
|---|---|---|
| K @ 25° C. = $K_R$ | 12899 | 12023 |
| K @ $T_C$ = $K_C$ | 17156 | 15269 |
| $(K_{-30° C.} - K_R)/K_R \times 100\%$ | −77 | −74 |
| $(K_C - K_R)/K_R \times 100\%$ | 33 | 27 |
| $(K_{85° C.} - K_R)/K_R \times 100\%$ | −78 | −76 |
| $T_C$ °C. | 7 | 7 |
| % DF | 0.4 | 0.33 |
| Density gm/cc | 5.95 | 5.98 |
| Y5V | NO | NO |

TABLE K

Addition of $SrTiO_3$

| Example | 38 | | 39 | | 40 | |
|---|---|---|---|---|---|---|
| BZT Powder | 10Z*BT + 20Z*BT | | 10Z*BT + 20Z*BT | | 10Z*BT + 20Z*BT | |
| mole % Zr | 15 | | 15 | | 15 | |
| Flux | $5CdO.2SiO_2$ | | $5CdO.2SiO_2$ | | $5CdO.2SiO_2$ | |
| mole % $SrTiO_3$ | 1 | | 2 | | 5 | |
| A/B ratio | 1.031 | | 1.031 | | 1.031 | |
|  | Wt basis | Mole basis | Wt basis | Mole basis | Wt basis | Mole basis |
| BZT Powder | 99.23 | 99.00 | 98.46 | 98.00 | 96.13 | 95.01 |
| $SrTiO_3$ | 0.77 | 1.00 | 1.54 | 2.00 | 3.87 | 4.99 |
| Flux | 2.02 | 0.63 | 2.02 | 0.63 | 2.02 | 0.63 |
| $BaCO_3$ | 1.31 | 1.59 | 1.31 | 1.58 | 1.31 | 1.57 |
| $Nb_2O_5$ | 0.76 | 0.68 | 0.76 | 0.68 | 0.76 | 0.68 |
| $MnCO_3$ | 0.10 | 0.21 | 0.10 | 0.21 | 0.10 | 0.21 |

TABLE K-continued

| Addition of SrTiO₃ | | | |
|---|---|---|---|
| Example | 38 | 39 | 40 |
| K @ 25° C. = $K_R$ | 7956 | 7845 | 7660 |
| K @ $T_C$ = $K_C$ | 10343 | 10590 | 13022 |
| $(K_{-30° C.} - K_R)/K_R \times 100\%$ | −48 | −45 | −23 |
| $(K_C - K_R)/K_R \times 100\%$ | 30 | 35 | 70 |
| $(K_{85° C.} - K_R)/K_R \times 100\%$ | −67 | −70 | −67 |
| $T_C$ °C. | 4 | 2 | −5 |
| % DF | 0.27 | 0.25 | 0.14 |
| Density gm/cc | 5.97 | 5.92 | 5.92 |
| Y5V | NO | NO | NO |

TABLE L

| Addition of CaTiO₃ | | | | | | |
|---|---|---|---|---|---|---|
| Example | 41 | | 42 | | 43 | |
| BZT Powder | 10Z*BT + 20Z*BT | | 10Z*BT + 20Z*BT | | 10Z*BT + 20Z*BT | |
| mole % Zr | 14.5 | | 14.5 | | 14.5 | |
| Flux | 5CdO.2SiO₂ | | 5CdO.2SiO₂ | | 5CdO.2SiO₂ | |
| mole % CaTiO₃ | 2 | | 5 | | 10 | |
| A/B ratio | 1.031 | | 1.031 | | 1.031 | |
| | Wt basis | Mole basis | Wt basis | Mole basis | Wt basis | Mole basis |
| BZT Powder | 98.86 | 98.01 | 97.10 | 95.00 | 94.09 | 90.01 |
| CaTiO₃ | 1.14 | 1.99 | 2.90 | 5.00 | 5.91 | 9.99 |
| Flux | 2.02 | 0.63 | 2.02 | 0.63 | 2.02 | 0.63 |
| BaCO₃ | 1.31 | 1.59 | 1.31 | 1.58 | 1.31 | 1.57 |
| Nb₂O₅ | 0.76 | 0.68 | 0.76 | 0.68 | 0.76 | 0.67 |
| MnCO₃ | 0.10 | 0.21 | 0.10 | 0.20 | 0.10 | 0.20 |
| K @ 25° C. = $K_R$ | 8200 | | 5886 | | 2692 | |
| K @ $T_C$ = $K_C$ | 10004 | | 7299 | | 2800 | |
| $(K_{-30° C.} - K_R)/K_R \times 100\%$ | −56 | | −26 | | −10 | |
| $(K_C - K_R)/K_R \times 100\%$ | 22 | | 24 | | 4 | |
| $(K_{85° C.} - K_R)/K_R \times 100\%$ | −67 | | −58 | | −30 | |
| $T_C$ °C. | 5 | | 0 | | 0 | |
| % DF | 0.23 | | 0.26 | | 0.62 | |
| Density gm/cc | 5.92 | | 5.89 | | 5.67 | |
| Y5V | YES | | YES | | YES | |

TABLE M

| Effect of amount of additives | | | | | | |
|---|---|---|---|---|---|---|
| Example | 44 | | 45 | | 46 | |
| BZT Powder | 14% BZT | | 14% BZT | | 14% BZT | |
| mole % Zr | 14 | | 14 | | 14 | |
| Flux | 5CdO.2SiO₂ | | 5CdO.2SiO₂ | | 5CdO.2SiO₂ | |
| A/B ratio | 1.028 | | 1.030 | | 1.032 | |
| | Wt basis | Mole basis | Wt basis | Mole basis | Wt basis | Mole basis |
| BZT Powder | 100.00 | 100.00 | 100.00 | 100.00 | 100.00 | 100.00 |
| Flux | 1.86 | 0.58 | 2.00 | 0.63 | 2.14 | 0.67 |
| BaCO₃ | 1.21 | 1.47 | 1.30 | 1.58 | 1.39 | 1.69 |
| Nb₂O₅ | 0.74 | 0.67 | 0.80 | 0.72 | 0.86 | 0.77 |
| MnCO₃ | 0.10 | 0.21 | 0.10 | 0.21 | 0.10 | 0.21 |
| Wt % Total | 3.91 | 2.93 | 4.20 | 3.14 | 4.50 | 3.34 |

TABLE M-continued

Effect of amount of additives

| Example | 44 | 45 | 46 |
|---|---|---|---|
| K @ 25° C. = $K_R$ | 14276 | 14592 | 12740 |
| K @ $T_C$ = $K_C$ | 16417 | 17948 | 17199 |
| $(K_{-30° C.} - K_R)/K_R \times 100\%$ | −80 | −79 | −74 |
| $(K_C - K_R)/K_R \times 100\%$ | 15 | 23 | 35 |
| $(K_{85° C.} - K_R)/K_R \times 100\%$ | −78 | −79 | −78 |
| $T_C$ °C. | 15 | 12 | 10 |
| % DF | 0.31 | 0.24 | 0.28 |
| Density gm/cc | 5.93 | 5.91 | 5.91 |
| Y5V | YES | [YES] | NO |

15

TABLE N

PROPERTIES OF MULTILAYER CAPACITORS

| Example | 47 | 48 | 49 | 50 | 51 | 52 |
|---|---|---|---|---|---|---|
| BZT Powder | 14% BZT | 14% BZT | 10Z*BT + 20Z*BT | 10Z*BT + 20Z*BT | 10Z*BT + 20Z*BT | 10Z*BT + 20Z*BT |
| mole % Zr | 14 | 14 | 14 | 15 | 14.5 | 15 |
| Flux | 5CdO.2SiO$_2$ | 5CdO.2SiO$_2$ | 5CdO.2SiO$_2$ | 5CdO.2SiO$_2$ | 5CdO.2SiO$_2$ | 5CdO.2SiO$_2$ |
| A/B ratio | 1.031 | 1.028 | 1.031 | 1.031 | 1.031 | 1.029 |

| | Wt basis | Mole basis | Wt basis | Mole basis | Wt basis | Mole basis | Wt basis | Mole basis | Wt basis | Mole basis | Wt basis | Mole basis |
|---|---|---|---|---|---|---|---|---|---|---|---|---|
| BZT Powder | 100 | 100 | 100 | 100 | 100 | 100 | 100.00 | 100.00 | 100.00 | 100.00 | 100.00 | 100.00 |
| Flux | 2.02 | 0.63 | 1.88 | 0.59 | 2.02 | 0.63 | 2.02 | 0.63 | 2.02 | 0.63 | 2.02 | 0.63 |
| BaCO$_3$ | 1.31 | 1.59 | 1.36 | 1.64 | 1.31 | 1.59 | 1.31 | 1.59 | 1.31 | 1.59 | 0.00 | 0.00 |
| Nb$_2$O$_5$ | 0.76 | 0.68 | 0.86 | 0.77 | 0.76 | 0.68 | 0.76 | 0.68 | 0.76 | 0.68 | 0.00 | 0.00 |
| MnCO$_3$ | 0.10 | 0.21 | 0.10 | 0.21 | 0.10 | 0.21 | 0.10 | 0.21 | 0.10 | 0.21 | 0.10 | 0.21 |
| La$_2$Ti$_2$O$_7$ | 0.00 | 0.00 | 0.00 | 0.00 | 0.00 | 0.00 | 0.00 | 0.00 | 0.00 | 0.00 | 1.39 | 0.69 |

| | 47 | 48 | 49 | 50 | 51 | 52 |
|---|---|---|---|---|---|---|
| AD thickness u | 17.5 | 17.5 | 18 | 17 | 17 | 16 |
| No. of ADs | 9.67 | 9.67 | 6.67 | 10.67 | 15 | 10 |
| K @ 25° C. = $K_R$ | 22306 | 12264 | 21753 | 11790 | 19934 | 20492 |
| K @ $T_C$ = $K_C$ | 24537 | 14226 | 25233 | 17096 | 26911 | 24181 |
| $(K_{-30° C.} - K_R)/K_R \times 100\%$ | −72 | −73 | −70 | −27 | −41 | −40 |
| $(K_C - K_R)/K_R \times 100\%$ | 10 | 16 | 16 | 45 | 35 | 18 |
| $(K_{85° C.} - K_R)/K_R \times 100\%$ | −83 | −83 | −83 | −79 | −82 | −82 |
| $T_C$ °C. | 20 | 17 | 15 | 5 | 7 | 10 |
| % DF | 5.8 | 1.2 | 7.2 | 2.5 | 5.2 | 6.4 |
| UDBV | | | | | | |
| Ave | 450 | | 480 | 525 | 310 | |
| high | 750 | | 650 | 600 | 420 | |
| Life Test 125° C.; 100 V | No degradation | | No degradation | No degradation | No degradation | No degradation |
| Density gm/cc | 6.1 | | | | 5.85 | |
| Y5V | [YES] | [YES] | [YES] | NO | NO | YES |

What is claimed is:

1. A method for making a ceramic powder mixture comprising:

a) preparing a powder mixture having an average particle size of about 1 micron by combining:

from 96 to 98 mole percent of precursors of a stoichiometric barium zirconate titanate (BZT) wherein zirconium amounts to from 13.5 to 15.0 mole percent, and wherein up to 4 mole % of said barium is replaced by strohtium;

a compound containing from 0.5 to 1.5 mole percent of Curie-point shifter cations;

a sintering flux consisting of from 1.2 to 2.6 weight percent of a cadmium silicate wherein the molar ratio of CdO to SiO$_2$ ranges from 1:1 to 3:1 inclusive;

from zero to 0.01 mole percent of Pb; and from zero to 2 mole % of an alkaline earth metal selected from barium, calcium, strontium and combinations thereof to effect in said powder mixture a ratio (A/B) of the large cations (A) to the small cations (B) in the range from 1.024 to 1.035; and b) partially calcining said homogeneous mixture at approximately 700° C. to obtain a powder comprised of agglomerates of said homogeneous powder mixture wherein each of said agglomerates has essentially the same composition, to provide a powder mixture capable of being formed into a body that can be fired to maturity at no higher than 1100° C., and subsequently annealed at a lower temperature to provide a mature dielectric ceramic body meeting the Y5V standard and having a dielectric constant greater than 10,000 at the Curie temperature which lies between 0°–20° C.

2. The method of claim 1 wherein said Curie temperature shifter cations are selected from niobium, tantalum, lanthanum and combinations thereof.

3. The method of claim 1 wherein said combining additionally includes less than 0.05 weight percent of free silica.

4. The method of claim 1 wherein said combining additionally includes from 0.05 to 0.21 weight percent $MnCO_3$.

5. A method for making a dielectric ceramic body comprising:

a) preparing a powder mixture having an average particle size of about 1 micron by combining:

from 95 to 98 weight percent of precursors of a stoichiometric barium zirconate titanate (BZT) wherein zirconium amounts to from 13.5 to 15.0 mole percent of all the small cations in said BZT, and wherein up to 4 mole percent of said barium is replaced by strontium;

from 0.5 to 1.5 mole percent of a Curie-point shifter cations, from a sintering flux consisting of 1.2 to 2.6 weight percent of a cadmium silicate wherein the molar ratio of CdO to $SiO_2$ ranges from 1:1 to 3:1 inclusive, from zero to 0.01 mole percent of Pb, from zero to 2 mole percent of an alkaline earth metal selected from barium, calcium, strontium and combinations thereof to effect in said powder mixture a ratio (A/B) of the large cations (A) to the small cations (B) in the range from 1.024 to 1.035, wherein the alkaline-earth metals, lanthanum and cadmium are large cations; and titanium, zirconium, niobium and manganese are small cations;

b) further mixing said powder mixture to form a homogenous powder mixture; and c) partially calcining said homogeneous mixture at approximately 700° C. to obtain a powder comprised of agglomerates of said homogeneous powder mixture;

d) forming a body of said calcined homogeneous mixture;

e) applying at least two separate electrodes to said body f) sintering said body at about 1100° C. in a closed container; and g) annealing said body at about 1050° C. in an open air atmosphere to provide a mature dielectric ceramic body having a dielectric constant greater than 10,000 at the Curie temperature which lies between 0°–20° C.

6. The method of claim 5 wherein said Curie temperature shifter cations are selected from niobium, tantalum, lanthanum and combinations thereof.

7. The method of claim 5 wherein said combining additionally includes less than 0.05 weight percent of free silica.

8. The method of claim 5 wherein said combining additionally includes from 0.05 to 0.21 mole percent $MnCO_3$.

9. The method of claim 5 wherein said mature dielectric ceramic body has a Curie temperature lying between 5° C. and 20° C.

* * * * *